(No Model.)
J. F. BRAYER.
SHELF FOR STOVES OR RANGES.
No. 394,093. Patented Dec. 4, 1888.
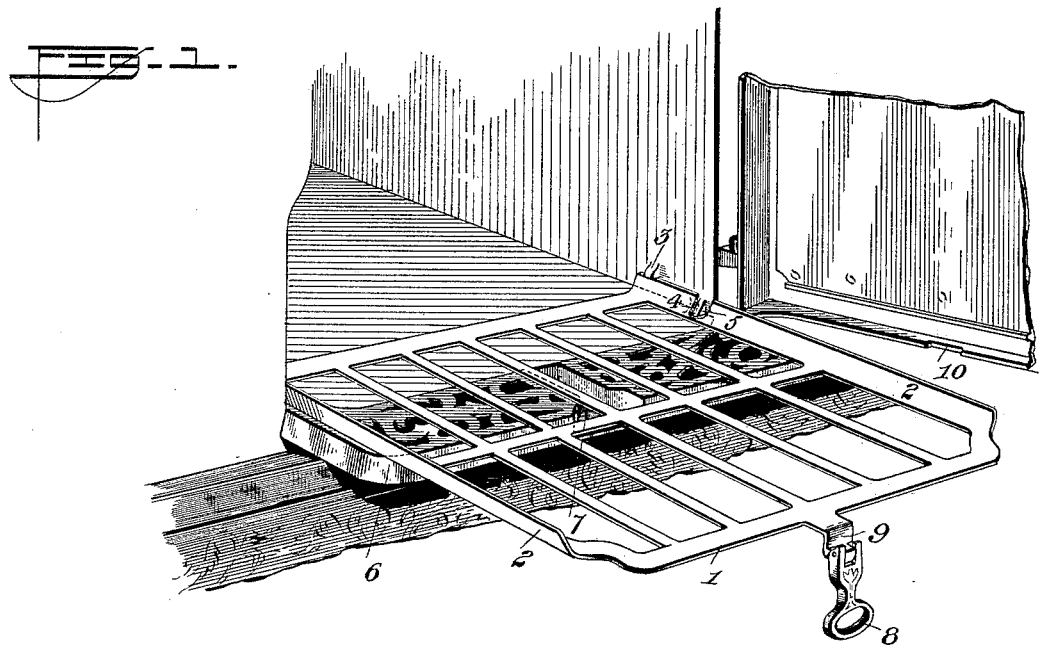
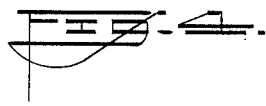
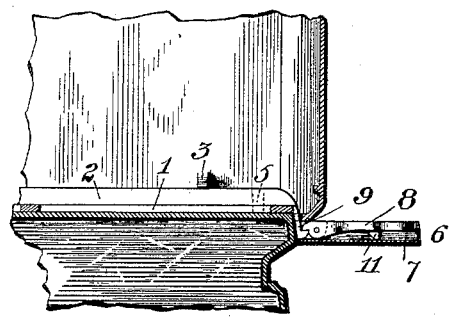
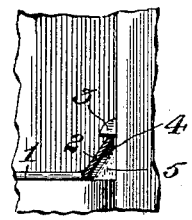
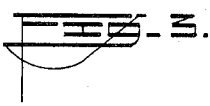
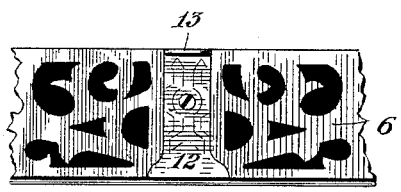

UNITED STATES PATENT OFFICE.

JOHN F. BRAYER, OF ROCHESTER, NEW YORK.

SHELF FOR STOVES OR RANGES.

SPECIFICATION forming part of Letters Patent No. 394,093, dated December 4, 1888.

Application filed July 7, 1888. Serial No. 279,311. (No model.)

*To all whom it may concern:*

Be it known that I, JOHN F. BRAYER, a citizen of the United States, residing at Rochester, in the county of Monroe and State of New York, have invented certain new and useful Improvements in Shelves for Stoves or Ranges; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of the invention is to provide a rack or shelf for stoves or ranges adapted to be moved in and upon the bottom of an oven and above an exterior shelf recessed to receive the handle of the rack; and it consists in the devices hereinafter described and pointed out.

In the accompanying drawings, Figure 1 represents a perspective view of the improved rack and shelf, the rack being represented as drawn out. Fig. 2 represents a central vertical section, the rack being pushed into the oven and its handle resting in a recess in the shelf. Fig. 3 represents a plan of a section of the exterior shelf provided with a detachable plate fitting the recess therein; and Fig. 4 is a partial view of one corner of the oven, showing the stops on the rack and oven.

The figure of reference 1 indicates the rack provided with upturned flanges 2, which serve to stiffen the rack, preferably made of light cast-iron. These flanges guide the rack in its inward and outward movements, and obviate to some extent the binding effect incident to the use of a rack or shelf having plain edges. The rack is inserted under bearings or lugs 3, one preferably on each side, the office of which is to prevent the rack from falling when drawn out to receive a cooking utensil or other object, or to expose to view such object previously placed upon the same. The weight of the rack or of the rack and its contents in its outer position is ordinarily borne on the oven-bottom at the front, the tipping of the rack being prevented by the lugs under which the flanges of the shelf bear, as will be readily understood.

To prevent the rack from being accidentally drawn out too far or out beyond the lugs 3, a stop, 4, is provided in its edge or flange, and arranged to engage the rear of a lug, 5, fixed in or near the angle between the oven bottom and sides. This stop 4 may be made removable, a seat or hole being provided in the flange of the rack to receive the same.

If necessary, the edge of the rack or its flange may be provided with a slight enlargement in which this hole is formed, and, if desired, it may be screw-threaded to receive a screw. This hole may be formed in the rack by casting or otherwise, and a suitable pin or screw can be dropped into it behind lug 5 after the rack has been introduced into the oven. If it is desired to remove the rack, the pin 4 can be taken out and the rack drawn completely out of the oven. Such pin and lug or stop can be used upon both sides of the oven, if desired. They might also be entirely omitted without sacrificing the advantages of other features of the improvement, or stops of other kinds could be employed—as, for example, upward projections formed on the extreme rear end of the flanges and arranged to engage the rear of lugs 3, as heretofore practiced. The stops 4 are not absolutely necessary, as the user of the rack by care may avoid drawing the rack out beyond the bearings 3. If no stops are provided, however, to prevent the accidental drawing out of the rack beyond the bearings 3, these latter may be made longer in horizontal direction to allow a greater range of movement after the end of the flange has been drawn out near the bearing. The parts above described would operate were a bearing, 3, provided only upon one side, as the flanges 2 of the rack render it sufficiently strong and stiff to hold a considerable weight when drawn out, though it might have a bearing under lug 3 at one corner only; and in case the rack were heavily loaded the shelf hereinafter to be described would aid it to support the burden under such circumstances.

If but one lug, 3, were used, the shelf could be introduced or removed from the oven by raising the side opposite the lugs 3 and 5, so that the flange adjacent to the lugs could be moved sidewise out of engagement therewith, and this could be done even though pin 4 were not removable, one of which may be detachably connected to the oven, if desired; or the side flanges of the rack may be notched, so that when a notch is brought immediately under a bearing, 3, by moving the rack the latter can be lifted above the bearing and stops in a manner heretofore well known. It is preferred, however, to place stops 4 and 5 near the door and about four inches from the bearing 3, and of such size that they overlap slightly or about three-sixteenths of an inch. Thus constructed they will ordinarily be kept in position to engage each other, and yet can be disengaged to allow removal of the rack by slightly lifting its outer end.

The shelf 6 is of usual construction, except that it is provided on its upper surface with a recess, 7, to receive the handle 8 of the rack. This handle, the operative position of which is shown in dotted lines in Fig. 1, is preferably hinged to an offset, 9, of the rack, which offset is designed to avoid the necessity of a slot or opening in the front wall of the door, the lower flange of which door is, however, formed with a slight recess, 10, to allow the door to fit over the vertical part of the offset and against the stove. When the rack is within the oven, the handle rests in the recess 7, as indicated in Fig. 2, and it may be provided when required with a projection, 11, of suitable size to support the handle, so that its upper surface shall be in the upper plane of the shelf. The upper and outer surfaces of the shelf and handle and of the filling-piece next to be described are preferably nickel-plated and otherwise ornamented.

12 denotes a piece adapted to fit in recess 7 and be detachably secured therein, as by a screw. Its purpose is to fill the recess and provide a level surface on the upper side of the shelf when the rack 1 is moved to a higher plane in the oven upon upper supporting ribs or flanges, as is customary in the use of oven shelves or racks, or in case the rack is laid aside or dispensed with. It has a flange at 13 to fill the recess or opening in the oven-door.

Instead of hinging the handle to an offset, it might be hinged or otherwise connected directly to the rack and on a level with the main part of the same. Such construction would render necessary a recess or opening in the front wall of the oven-door, but would obviate the use of the recess in the shelf.

In the present construction the shelf 6 serves, in addition to other purposes, to provide a support to the rack when drawn out and heavily loaded. The rack under such circumstances will bend or spring slightly, so as to rest on the outer edge of the shelf and receive support from the same, though ordinarily there might not be any contact between them. If desired, the outer edge of the shelf could be slightly raised above its general level, so as to come in contact with and support the loaded rack whenever drawn out with a weight upon it.

I am aware that external foot-rests or shelves have been attached to stoves adjacent to the oven, and, further, that oven-doors have been recessed for the passage of the handles of a rack, and that oven-racks have been provided with projections on upturned flanges to engage stops cast on the side of the oven; but such stops have either rendered the rack incapable of entire removal from the stove without taking the latter apart or have been necessarily placed high enough to allow the projection to pass under said stops, which construction allows the front of the rack to drop too low, and sometimes even permits it to be accidentally drawn entirely out of the oven, and such devices are not of my invention.

My construction provides that the rack can be inserted under or removed from the stops by a slight inclination of the rack from a horizontal plane, and therefore it allows the stop 3 to be placed so near the oven-bottom as to obviate excessive tipping down of the rack when drawn out to its outer operative position. A slight overlapping of the parts 4 and 5 (indicated by a dotted line) will be sufficient to prevent the rack from being drawn out entirely except when its outer edge is intentionally elevated for that purpose.

I am aware that stops or projections of various forms have been employed with stove-racks, and such devices are not, broadly, of my invention, which consists in the particular construction hereinafter pointed out. In one case heretofore the stop or projection was placed on the top of the rack, the projection being curved to facilitate its introduction under a corresponding stop on the oven; but this did not allow the rack to rest on the oven-bottom and permit the engagements of the stops without an objectionable play between the rack and the stop fixed to the oven. In another case the edge of the rack was cut away to permit the introduction of the shelf under a stop, and in still another instance the rack was provided with a lateral projection at a rear corner, the opposite corner being rounded to admit its introduction behind the edge of the stove-plate, against which the lateral projection was designed to strike, to prevent the rack from being drawn out too far—a construction not adapted to an oven-door opening as wide as the oven. My rack is made without lateral indentations, curves, or projections extending beyond its main lines, and can be easily inserted or removed, though secure against accidental removal, while at the same time it is held closely upon the oven-bottom by the stop on the oven.

My improvement also provides that the exterior shelf shall aid in supporting the rack when heavily loaded and drawn out; and, further, this shelf has a recess and filling-piece, which latter provides that its upper surface shall be practically continuous when a rack-handle is not used, and adapts it to receive such handle when desired, and so that it lies below the oven-door and below or in the surface of said shelf, and, further, the offset on the rack passes through a recess in the oven-door flange, which recess can be made much smaller than possible if either the body of the rack or its handle were placed in the path of the oven-door, it being desirable that such recess should be made as small as practicable.

Having thus described my invention, what I desire to claim and secure by Letters Patent is—

1. In an oven, the rack free from lateral indentations or projections and provided with stop 4 under its side flange, in combination with the side of the oven having a stop, 5, and also stop 3 in close proximity to the rack, which rests horizontally on the oven-bottom, the rack, oven, and oven-doorway being of the same width, substantially as set forth.

2. The rack having an offset and a handle hinged to said offset, in combination with the door having a recess in its lower flange to receive the offset, and with the recessed shelf, substantially as set forth, whereby the handle rests and fills the recess of the shelf out of the path of the door, and whereby the handle may drop on its hinge when drawn beyond the shelf.

3. The rack provided with upturned strengthening-flanges at its sides, in combination with lugs on the oven-wall arranged to bear on a flange to prevent its tipping when drawn out, and an exterior shelf secured to the stove near the level of the oven-floor and adapted to aid in supporting the rack when drawn out, substantially as set forth.

In testimony whereof I affix my signature in presence of two witnesses.

JOHN F. BRAYER.

Witnesses:
 JNO. D. LYNN,
 JOHN H. CHADSEY.